July 22, 1958  P. A. SOSNOSKI  2,844,765
PROTECTIVE CIRCUITRY
Filed Dec. 6, 1954

Peter A. Sosnoski
INVENTOR.

United States Patent Office 2,844,765
Patented July 22, 1958

2,844,765
PROTECTIVE CIRCUITRY
Peter A. Sosnoski, Shamokin, Pa.

Application December 6, 1954, Serial No. 473,413

5 Claims. (Cl. 317—18)

This invention relates to new and useful improvements in protective apparatus for controlling the flow of current through electrical circuits to render the circuits inoperative should grounding occur.

The primary object of the present invention results in the provision of a simple and efficient circuit arrangement for allowing the transmission of electrical current therethrough from a source of electrical power to the circuit to be protected, but which is so arranged and connected that in the event of the grounding of any part of the circuit in any manner, the circuit to the source of electrical power will be instantaneously cut off and cannot be again closed until the ground is removed or repaired.

A further object of the invention resides in the provision of a protective circuitry for use in homes, office buildings, warehouses and the like which will provide adequate protection for the occupants thereof should a current carrying conductor be accidentally touched, thereby preventing injury and loss of lives that might otherwise occur.

This application is a continuation-in-part of application, Serial No. 420,847, filed April 5, 1954 for Electric Lifesaver.

Still another object of the invention resides in the provision of means for automatically opening the circuit from a source of electrical power to a circuit protected by the invention whereby upon the grounding of a conductor or other electrical element, the current will immediately cease to flow, thereby preventing disastrous fires which would otherwise cause damage, injury or death.

Still further objects and features of this invention reside in the provision of a protective circuitry that is simple in construction and connection, highly efficient in operation, and which can be inexpensively and quickly installed in various buildings or other locations, thereby permitting wide distribution and utilization.

Figure 1:
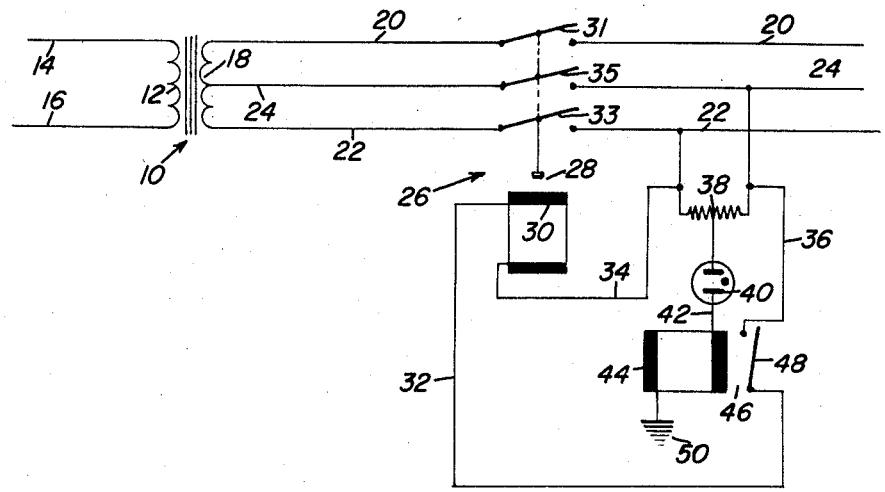
Figure 2:
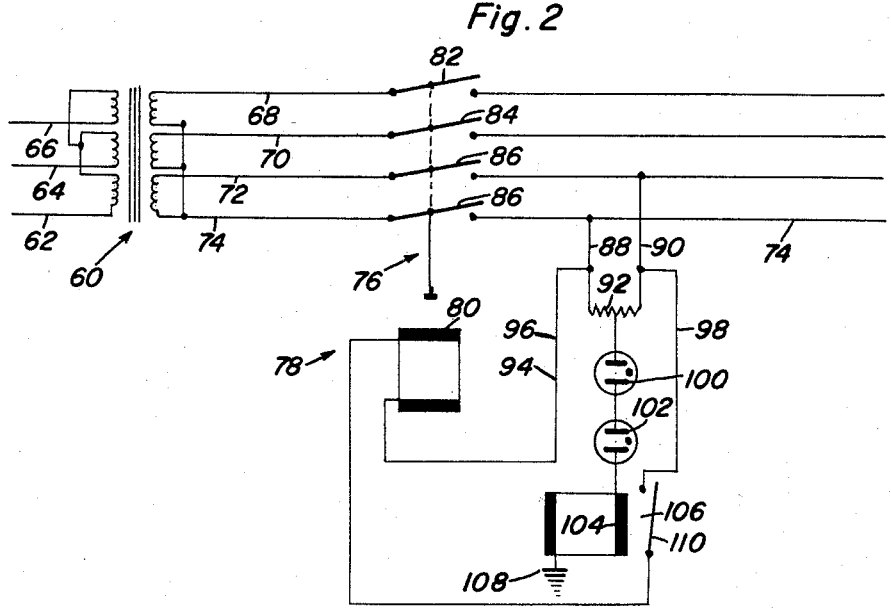

These, together with the various ancillary objects and features of the invention which will become apparent as the following description proceeds, are attained by this protective circuitry, preferred embodiments of which have been illustrated in the accompanying drawings, by way of example only, wherein:

Figure 1 is a schematic diagram showing an embodiment of the invention as used in connection with three-wire single phase or polyphase systems; and Figure 2 is a schematic diagram of an embodiment of the invention as can be utilized in conjunction with four-wire three phase systems.

With continuing reference to the accompanying drawings wherein like reference numerals designate similar parts throughout the various views, reference numeral 10 generally designates a transformer which has the primary coil 12 thereof connected across the supply leads 14 and 16 connected to a suitable source of electrical power. The secondary coil 18 of the transformer 10 has live wires 20 and 22 connected to the terminals thereof while the center tap of the transformer 18 has a neutral wire 24 connected thereto. The three wires 20, 22 and 24 serve as the carriers of electrical power to the electrical appliances, lights, machinery or the like with which it is desired to supply electrical power, and arranged ahead of the power consuming devices, there is provided the protective circuitry generally designated by reference numeral 26, it being recognized that the protective circuitry includes the arrangement with the transformer 10.

The protective circuitry 26 includes a relay 28 including a coil 30 and switch elements 31, 33 and 35 connected in the wires 20, 22 and 24, respectively. The relay coil 30 is activated by a supply circuit 32 including conductors 34 and 36 connected across a resistor 38 which is connected to either of the hot wires 20 or 22 and the neutral wire 24.

Connected to the midpoint or neutral point of the resistor 38 is a current limiting device 40, comprising a neon tube. Connected to the neon tube 40 by conductor 42 is the coil 44 of a relay 46 controlling switch element 48. The coil 44 is grounded, as at 50, and it is noted that the switch element 48 and hence the relay 46 controls the flow of current in the supply circuit 32.

In operation, should either of the lines 20, 22 or 24 become grounded, as by a person who is grounded touching either of these wires or by any other means, a very low current will flow through the relay coil 44 and the neon tube 40 due to the high impedance of the neon tube 40. However, the current passing through the coil 44 will be sufficient to close the switch element 48 thus closing the circuit to the coil 30 which will then cause the relay 28 to open the switches 31, 33 and 35 in a positive manner.

In Figure 2 there is shown a modified form of the invention in which there is provided a transformer 60 to which polyphase three wire conductors 62, 64 and 66 are connected and from which the three phase hot wires 68, 70 and 72 as well as the neutral wire 74 are connected. A relay 76 forms the control element of the protective circuitry indicated at 78 for opening the circuit from the conductors 68, 70, 72 and 74 to the current consuming devices, the relay 76 including a coil 80 as well as switch elements 82, 84, 86 and 88 operated by the armature of the coil 80 of the relay 76. Connected across the neutral line 74 and any one of the hot wires 68, 70 and 72 by means of conductors 88 and 90, respectively, is a resistor 92. Connected to the conductors 88 and 90 is the supply circuit 94 for the coil 80, the supply circuit including conductors 96 and 98. Connected to the midpoint of the resistor 92 or the neutral point thereof are any given or selected number of neon tubes 100, 102 which are connected to the coil 104 of a relay 106, the coil being grounded at 108. The relay 106 includes a switch element 110 controlling flow of current through the supply circuit 94, operation of the switch element 100 thereby controlling operation of the coil 80 and thereby causing instantaneous actuation of the relay 76 should any one of the hot wires 68, 70 or 72 or the neutral wire 74 become grounded accidentally or otherwise.

It is to be recognized that any suitable number of neon tubes 100 and 102 which would serve as current limiting devices can be utilized.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A safety system for an electrical circuit comprising a transformer having a primary connected to a source of electrical power and a secondary connected to the electrical circuit including live wires and a neutral wire to be protected, a trip line comprising a resistor connected between one of said live wires and said neutral wire, a circuit breaker having switch elements in each of said lines to open and close said lines and located between said secondary and said trip line, a supply circuit connected across said resistor for actuating said circuit breaker, a relay connected between ground and the neutral point of said resistor, said relay controlling the flow of current in said supply circuit, and a voltage limiting device connected between said relay and said resistor.

2. A safety system for an electrical circuit comprising a transformer having a primary connected to a source of electrical power and a secondary connected to the electrical circuit including live wires and a neutral wire to be protected, a trip line comprising a resistor connected between one of said live wires and said neutral wire, a circuit breaker having switch elements in each of said lines to open and close said lines and located between said secondary and said trip line, a supply circuit connected across said resistor for actuating said circuit breaker, a relay connected between ground and the neutral point of said resistor, said relay controlling the flow of current in said supply circuit, and a voltage limiting neon tube connected between said relay and said resistor.

3. A safety system for an electrical circuit comprising a transformer having a primary connected to a source of electrical power and a secondary connected to the electrical circuit including live wires and a neutral wire to be protected, a trip line comprising a resistor connected between one of said live wires and said neutral wire, a circuit breaker having switch elements in each of said lines to open and close said lines and located between said secondary and said trip line, a supply circuit connected across said resistor for actuating said circuit breaker, a relay connected between ground and the neutral point of said resistor, said relay controlling the flow of current in said supply circuit, and a plurality of voltage limiting neon tubes connected in series between said relay and said resistor.

4. A safety system for a three wire electrical circuit comprising a transformer having a primary connected to a source of electrical power and a secondary connected to the electrical circuit to be protected, said electrical circuit including live wires connected to said secondary and a neutral wire connected to a central tap of said secondary, a trip line comprising a resistor connected between one of said live wires and said neutral wire, a circuit breaker having switch elements in each of said wires and disposed between said secondary and said trip line, a supply circuit for actuating said circuit breaker connected across said resistor, a relay connected between ground and the neutral point of said resistor, said relay controlling the flow of current in said supply circuit, a voltage limiting device connected between said relay and said resistor.

5. A safety system for a four wire, three phase electrical circuit, including live wires and a neutral wire comprising a transformer having a primary connected to a source of electrical power and a secondary connected to said electrical circuit, a circuit breaker in said power line, a trip line comprising a resistor connected between one of said live wires and said neutral wire, a supply circuit for actuating said circuit breaker connected across said resistor, a relay connected between ground and the neutral point of said resistor, said relay controlling the flow of current in said supply circuit, and a voltage limiting device connected between said relay and said resistor, said current limiting device comprising at least one neon tube.

References Cited in the file of this patent

UNITED STATES PATENTS

| | | |
|---|---|---|
| 1,523,803 | Goodwin | Jan. 20, 1925 |
| 1,988,121 | Hillebrand | Jan. 15, 1935 |
| 1,994,589 | O'Hagan | Mar. 19, 1935 |
| 2,079,636 | Sharp | May 11, 1937 |
| 2,697,217 | Jeffers | Dec. 14, 1954 |